United States Patent
Yokoyama (10) Patent No.: US 12,099,759 B2
(45) Date of Patent: Sep. 24, 2024

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Tatsuyuki Yokoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/686,706

(22) Filed: Mar. 4, 2022

(65) Prior Publication Data

US 2022/0283750 A1 Sep. 8, 2022

(30) Foreign Application Priority Data

Mar. 8, 2021 (JP) .................................. 2021-036259

(51) Int. Cl.
*G06F 3/12* (2006.01)
(52) U.S. Cl.
CPC ............ *G06F 3/121* (2013.01); *G06F 3/1234* (2013.01)
(58) Field of Classification Search
CPC ...... G06F 3/121; G06F 3/1234; G06F 3/1228; G06F 3/1285
See application file for complete search history.

(56) References Cited

U.S. PATENT DOCUMENTS

| | | | |
|---|---|---|---|
| 9,164,714 B2 * | 10/2015 | Kikuchi | .................. G06F 21/84 |
| 10,126,990 B2 | 11/2018 | Honda | |
| 2017/0264780 A1 * | 9/2017 | Yokoyama | ......... H04N 1/33384 |
| 2018/0067704 A1 * | 3/2018 | Kobayashi | ............ G06F 3/1285 |
| 2018/0219845 A1 * | 8/2018 | Sumiuchi | .......... H04M 1/72412 |
| 2019/0107984 A1 * | 4/2019 | Kanamori | ............. G06F 3/1285 |
| 2020/0073603 A1 * | 3/2020 | Kaneda | ................. G06F 3/1228 |
| 2021/0064300 A1 * | 3/2021 | Saigusa | ................. G06F 3/1225 |
| 2022/0206727 A1 * | 6/2022 | Narita | ................... G06F 3/1232 |

FOREIGN PATENT DOCUMENTS

JP 2016-170631 A 9/2016

* cited by examiner

*Primary Examiner* — John R Wallace
(74) *Attorney, Agent, or Firm* — VENABLE LLP (57) ABSTRACT

An information processing apparatus includes a controller having a memory containing instructions and a processor for executing the instructions to edit print data, transmit the edited print data to a printing apparatus, obtain first information from the printing apparatus according to an IPP (Internet Print Protocol), and make a predetermined notification based on the obtained first information. In addition, second information is obtained from the printing apparatus in a case where a predetermined operation is performed in response to the predetermined notification, and a display unit is controlled, based on the obtained second information, to display information concerning the printing apparatus. The information concerning the printing apparatus includes information not included in the predetermined notification.

25 Claims, 8 Drawing Sheets

INFORMATION PROCESSING APPARATUS, METHOD OF CONTROLLING INFORMATION PROCESSING APPARATUS, AND STORAGE MEDIUM

BACKGROUND

Field

The present disclosure relates to a technique of display control of information on a printing apparatus.

Description of the Related Art

In recent years, Windows (registered trademark) has been provided with a standard driver for common use in printing apparatus provided by a plurality of vendors. Such an OS standard driver (hereinafter also referred to as "OS standard print software") is packed with the OS (Operating System) and can be used by connecting a host computer on which the OS is installed to an arbitrary printing apparatus.

There is known an extension application for extending the capability of the OS standard print software. Japanese Patent Laid-Open No. 2016-170631 (hereinafter referred to as PTL 1) discloses a technique of extending the capability of notifying an error status of a printer by providing an extension application.

SUMMARY

Depending on the kind of extension application, there is a case where information obtainable by the mechanism of the OS standard print software is limited and detailed information cannot be provided.

An information processing apparatus according to an aspect of the present disclosure is a program which causes a computer to function as an extension application for extending OS standard print software, the program causing the computer to function as: a monitoring unit configured to obtain first management information from a printing apparatus according to an OS standard protocol and make a predetermined notification based on the obtained first management information; and a display control unit configured to, in a case where a predetermined operation is performed in response to the predetermined notification, obtain second management information from the printing apparatus according to a protocol different from the OS standard protocol and display information concerning the printing apparatus on a display unit.

Further features of the present disclosure will become apparent from the following description of exemplary embodiments with reference to the attached drawings.

DESCRIPTION OF THE EMBODIMENTS

Preferred embodiments of the present disclosure will be described below in detail with reference to the accompanying drawings. It should be noted that the following embodiments do not limit the present disclosure relating to the scope of claims and that not all combinations of the features described in the embodiments are necessarily essential for solving the problem to be solved by the present disclosure.

First Embodiment

Figure 1:
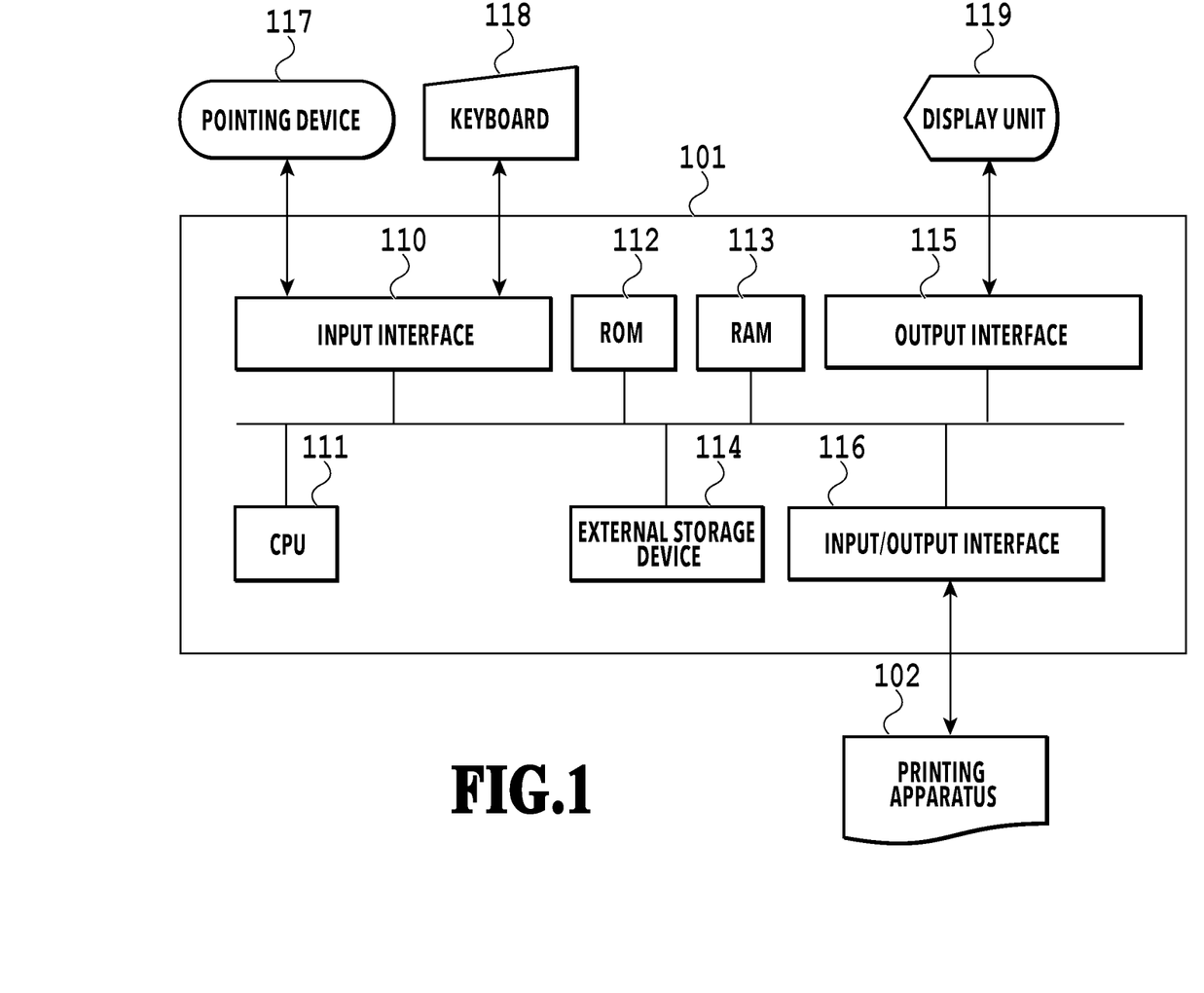
FIG. 1 is a block diagram showing a hardware configuration of a print system.

A hardware configuration of a print system of the present embodiment will be described with reference to FIG. 1. In FIG. 1, a host computer 101 is an example of an information processing apparatus and comprises an input interface 110, a CPU 111, a ROM 112, a RAM 113, an external storage device 114, an output interface 115, and an input/output interface 116. The input interface 110 is connected to an input device such as a keyboard 118 or a pointing device 117. The output interface 115 is connected to a display device such as a display unit 119.

The ROM 112 stores an initialization program. The external storage device 114 stores an application program group, an OS (Operating System), print data generating software that is an OS standard driver (OS standard print software), and various other kinds of data. The RAM 113 is used as, for example, a work memory in the execution of various programs stored in the external storage device 114.

In the present embodiment, the CPU 111 executes processing according to a procedure of a program stored in the ROM 112 and thereby executes processing of a flowchart to be described later and functions to be described later in the host computer 101. The printing apparatus 102 which is a connected device is connected to the host computer 101 via the input/output interface 116. The host computer 101 and the printing apparatus 102 are separately formed here but may be formed into a single information processing apparatus. Although an inkjet printer which performs printing by ejecting ink on paper is described as an example of the printing apparatus, printing may be performed by a different method (such as an electrophotographic method). The host computer 101 may be a desktop PC, a smartphone, a notebook PC, or the like.

Figure 2A:
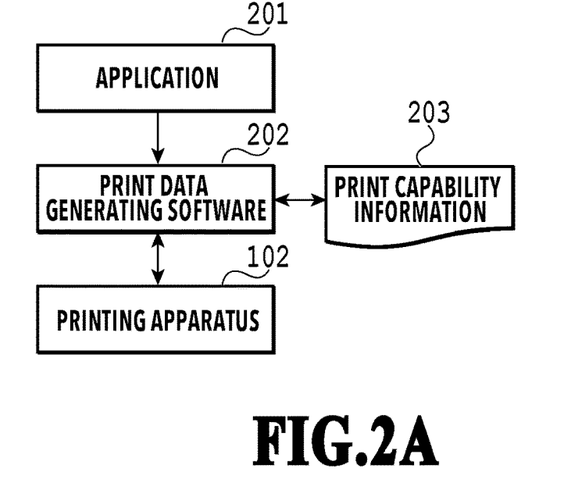
FIGS. 2A and 2B are block diagrams showing a system configuration example of the present disclosure.
Figure 2B:
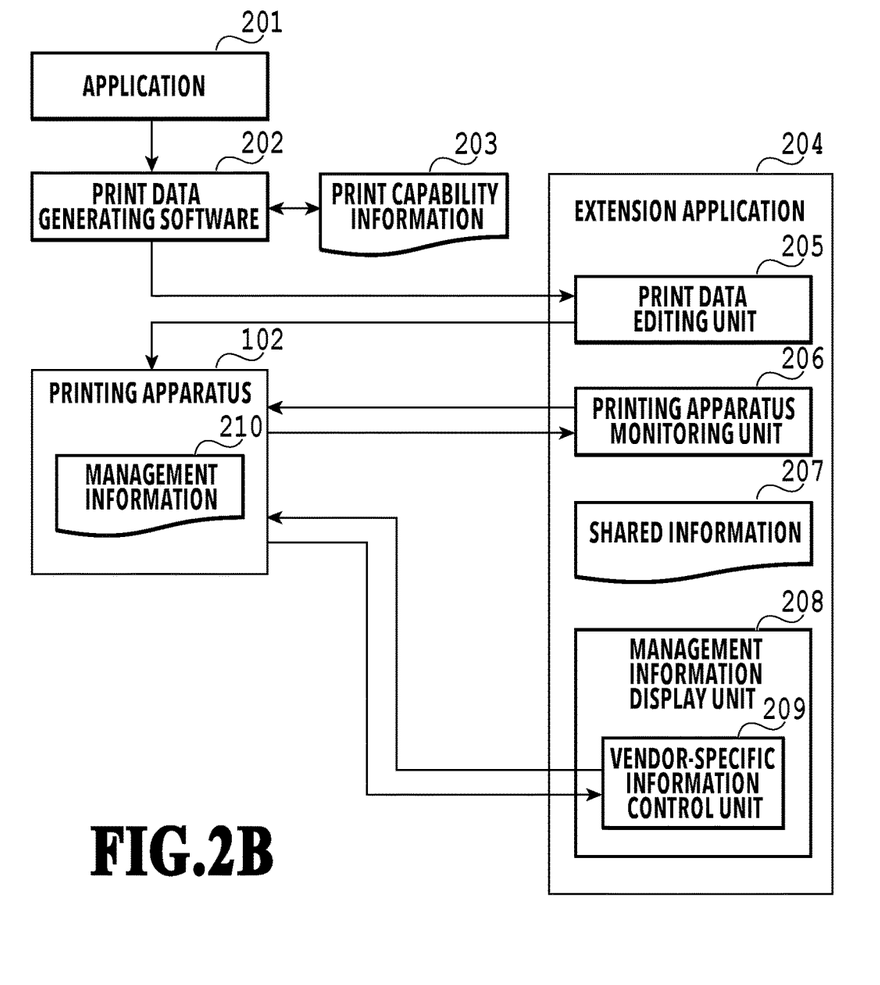

FIGS. 2A and 2B are diagrams schematically showing the configuration of the print system. A description will be given based on the premise that the print system uses the host computer 101 on which Windows (registered trademark) 10 by Microsoft (registered trademark) is installed as the OS. FIG. 2A is a diagram schematically showing the configuration of a print system of a comparative example in which an extension application as described in the present embodiment is not used. FIG. 2B is a diagram schematically showing the configuration in a case where an extension application 204 is associated with print data generating software 202 and the printing apparatus 102.

First, FIG. 2A will be described. An application 201 is software for generating contents to be printed and corresponds to, for example, a drawing application such as a document generating application or a spreadsheet application. Upon receipt of a print request from a user, the application 20 issues a print instruction to the OS (not shown). The print instruction includes print setting information for issuing an operation instruction to the print data generating software 202 or the printing apparatus 102. The print setting information is also referred to as PrintTicket.

The application 201 is capable of display control of a print setting screen provided by the print data generating software 202 or the OS. The print setting screen is configured to display a settable print capability and a setting value thereof according to print setting possibility information determined by the print data generating software 202. The print data generating software 202 determines the print setting possibility information based on print capability information 203. The print setting possibility information is also referred to as PrintCapabilities. The print setting information is generated based on print settings by a user on the print setting screen.

The print capability information 203 describes all settable print capabilities, setting values thereof, and an exclusive relationship between the setting values. The print capability information 203 is also referred to as Print Device Capabilities (PDC). The print capability information 203 is included in a configuration file of the print data generating software 202 and placed as an unchangeable file in the external storage device 114. The print data generating software 202 can also dynamically generate the print capability information 203. For example, the print data generating software 202 or the OS can be configured to obtain, from the printing apparatus 102, capability information which can be designated to the printing apparatus 102 and generate the print capability information 203 according to the obtained capability information, whereby the print data generating software 202 can enable a user to designate a print capability usable in each printing apparatus 102 according to the connected printing apparatus 102. In other words, even in a case where a printing apparatus having a different capability or a printing apparatus developed by a different vendor is connected, the print data generating software 202 can enable a user to designate a usable print capability according to the connected printing apparatus. The configuration described here uses IPP Class Driver installed in Windows (registered trademark) 10 as the print data generating software 202. The IPP Class Driver is a printer driver which executes print processing according to the specification of a standard print protocol called Internet Print Protocol (IPP). The IPP Class Driver is not a printer driver for a specific printing apparatus 102 but a standard driver for common use in a plurality of printing apparatus. The IPP Class Driver obtains capability information on a connected printing apparatus 102 and generates print capability information 203 based on the obtained information such that a user can designate a print capability supported by the connected printing apparatus 102.

The OS generates intermediate data (also referred to as input data) based on a print instruction output from the application 201 and passes the intermediate data to the print data generating software 202. The data output from the application for printing is data in Graphic Device Interface format (GDI data) or data in XML Paper Specification format (XPS data). In the case of using the IPP Class Driver as the print data generating software 202, the OS converts GDI data into XPS data and passes the converted XPS data to the print data generating software 202. The print data generating software 202 converts the intermediate data into print data which can be interpreted by the printing apparatus 102 and transmits the print data to the printing apparatus 102. The print data includes drawing data that is information on a picture to be formed on paper and print setting attribute information generated based on print setting information set by a user.

The printing apparatus 102 performs printing on paper based on the print data transmitted from the print data generating software 202. At this time, the printing apparatus 102 forms the drawing data included in the print data on paper by an operation according to the print setting attribute information included in the print data. The print setting attribute information includes a print quality (such as image quality priority or speed priority), designation of duplex printing, and the like. For example, in a case where the print setting attribute information includes designation of duplex printing, the printing apparatus 102 performs duplex printing.

Next, FIG. 2B will be described. The same portions as those in FIG. 2A will not be particularly mentioned. The extension application 204 is software which is not included in the OS in advance and is operated under the control of the OS. The extension application 204 can be installed by a user operating the host computer 101 and downloading the extension application 204 from an unshown server through a network. In a case where the printing apparatus 102 is connected to the host computer 101, the OS obtains device identification information from the printing apparatus 102. The OS may obtain an extension application 204 corresponding to the obtained device identification information from an unshown server through a network and install the extension application 204.

Incidentally, although the print data generating software 202 and the extension application 204 may be updated to an upgraded version, this update process may be performed at different timings. That is, the timing of obtainment of the print data generating software 202 by the host computer 101 may be different from the timing of obtainment of the extension application 204. A trigger for obtainment of the print data generating software 202 by the host computer 101 is also different from a trigger for obtainment of the extension application 204. At the time of installation of the extension application 204, the OS associates the extension application 204 with the print data generating software 202 and the printing apparatus 102.

The extension application 204 described in the present embodiment comprises a print data editing unit 205, a printing apparatus monitoring unit 206, shared information 207, and a management information display unit 208. The print data editing unit 205 edits print data generated by the print data generating software 202 and passes the edited print data to the OS. After the transmission of the print data, the printing apparatus monitoring unit 206 monitors the printing apparatus 102 for error occurrence. The shared information 207 is information which can be accessed in common from each unit and is a file stored in the external storage device 114 or information stored in the RAM 113. The management information display unit 208 is a display control unit which comprises a vendor-specific information control unit 209 and obtains vendor-specific information or transmits a vendor-specific command to the printing apparatus 102. In a case where the units in the extension application communicate with each other, the communication is indirectly performed via the extension application 204.

The extension application 204 uses an application programming interface (API) provided by the OS to write/read information to/from the shared information 207. By comprising the shared information 207 accessible in common from each unit, overlapped management of information can be avoided and capacity shortage of the external storage device 114 or the RAM 113 can be relieved. The operation of the extension application 204 may be finished each time the processing of each unit is finished. In this case, the OS activates the extension application 204 each time a request to use each unit is received. For example, although the OS finishes the operation of the extension application 204 in a case where the processing of the print data editing unit 205 is finished, the OS may keep the extension application 204 active even after the processing of the printing apparatus monitoring unit 206 is finished.

Next, the printing apparatus 102 will be described. The printing apparatus 102 stores management information. The management information is information including information such as a number of an error occurring in the printing apparatus 102, an ink remaining amount, a document name of a job being printed in the printing apparatus 102, information indicating a state of the job, an owner name, a printed page number, or a URL of an ink purchase site. The management information can be obtained by IPP communication using the printing apparatus monitoring unit 206 or unique-protocol communication using the vendor-specific information control unit 209 provided in the management information display unit 208. In the present embodiment, management information obtainable by the OS standard protocol communication using the printing apparatus monitoring unit 206 is referred to as first management information. In contrast, management information obtainable by the unique-protocol communication using the vendor-specific information control unit 209 provided in the management information display unit 208 is referred to as second management information. A difference between contents of the first and second management information will be described later.

Upon receipt of a print request from a user, the application 201 issues a print instruction to the OS. In response to the instruction from the OS, the print data generating software 202 converts intermediate data into print data which can be interpreted by the printing apparatus 102. The OS passes the converted print data to the print data editing unit 205. The OS may be further configured to pass print setting information included in the intermediate data to the print data editing unit 205.

The OS transmits the print data edited by the print data editing unit 205 to the printing apparatus 102. At this time, the OS activates the printing apparatus monitoring unit 206. After the transmission of the print data, the printing apparatus monitoring unit 206 monitors the printing apparatus 102 for error occurrence. The printing apparatus 102 performs printing on paper based on the print data transmitted from the print data generating software 202. At the time of printing, in the case of detecting an error such as an out-of-paper error, the printing apparatus monitoring unit 206 causes the OS to make a toast notification. A toast means a pop-up window temporarily displayed at the corner of the display screen and a toast notification indicates such pop-up display. In a case where a user performs an operation such as a click, double click, mouseover, keyboard operation, or touch on the toast, the management information display unit 208 provided in the extension application 204 performs display control to display detailed information about the printing apparatus 102. For example, the management information display unit 208 performs display control to display a GUI (described later with reference to FIG. 6) on the display unit 119. The displayed GUI shows more detailed information than the toast notification. This will be described later in detail.

A processing flow of the printing apparatus monitoring unit 206 will be described later in detail with reference to FIG. 3. A processing flow of the management information display unit 208 will be described later in detail with reference to FIG. 5. In the present embodiment, the extension application 204 is not limited to a configuration comprising all of the aforementioned functions and may comprise only some of the functions or comprise a different function.

As described above, the extension application 204 comprises at least one of the function of display control of a setting screen, the function of editing intermediate data, the function of editing print data input to the printing apparatus, and the function of extending a capability which can be designated by the print data generating software.

Figure 3:
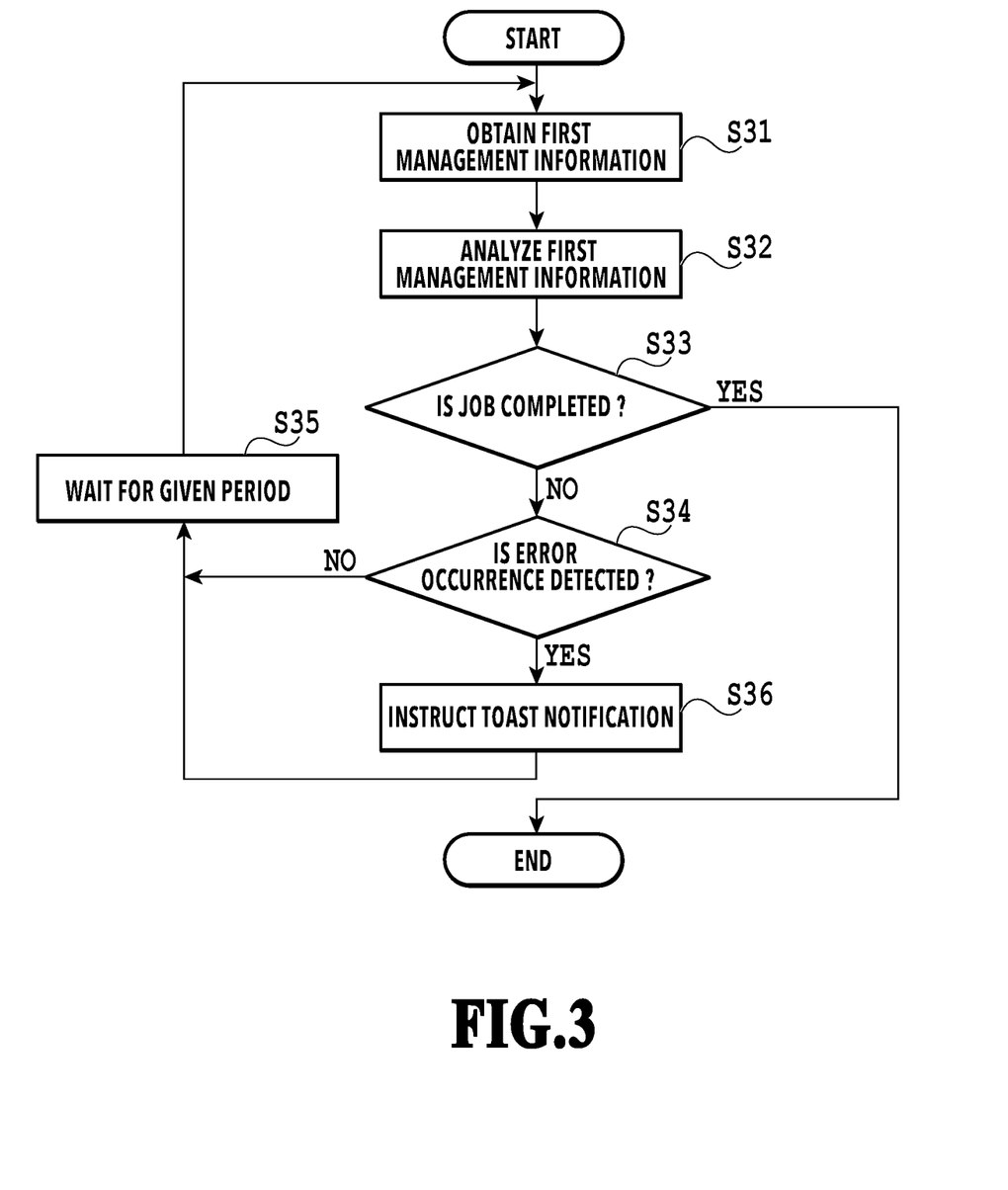
FIG. 3 is a diagram showing a processing flow of a printing apparatus monitoring unit.

FIG. 3 shows the processing flow of the printing apparatus monitoring unit 206. If print data (print job) is transmitted to the printing apparatus 102 via the print data editing unit 205, the OS activates the printing apparatus monitoring unit 206. The flowchart shown in FIG. 3 is a process executed by the printing apparatus monitoring unit 206 of the extension application 204. That is, the flowchart is implemented by the CPU 111 loading the program of the extension application 204 stored in the ROM 112 into the RAM 113 and executing the program. In the description of each process, sign "S" indicates a step in the flowchart, which also applies to the flowcharts subsequent to FIG. 3.

In S31, the printing apparatus monitoring unit 206 regularly obtains first management information from the printing apparatus 102 using, for example, Get-Printer-Attributes Request, which is an IPP printer attribute obtainment request. Alternately, the printing apparatus monitoring unit 206 obtains first management information from the printing apparatus 102 using Get-Job-Attributes Request, which is a job attribute obtainment request. Incidentally, the printing apparatus monitoring unit 206 is controlled by the OS so as to obtain minimum required information such as information indicating a state of a job. Accordingly, the printing apparatus monitoring unit 206 cannot obtain detailed information such as a number of an error occurring in the printing apparatus 102 obtained by the management information display unit 208 to be described later using the vendor-specific information control unit 209.

In S32, the printing apparatus monitoring unit 206 analyzes the first management information obtained in S31. More specifically, the printing apparatus monitoring unit 206 conducts analysis on error occurrence in the printing apparatus 102 based on the first management information obtained using the Get-Printer-Attributes Request. Further, the printing apparatus monitoring unit 206 conducts analysis on a state of a job being executed in the printing apparatus 102 based on the information obtained using the Get-Job-Attributes Request.

In S33, the printing apparatus monitoring unit 206 determines from the analysis result in S32 whether the job executed in the printing apparatus 102 has been completed. If it is determined that the job has been completed in the printing apparatus 102, the monitoring process is finished. If it is determined that the job has not been completed in the printing apparatus 102, the process advances to S34.

In S34, the printing apparatus monitoring unit 206 determines from the analysis result in S32 whether error occurrence in the printing apparatus 102 has been detected. If it is determined that an error occurs in the printing apparatus 102, the process advances to S36. If it is determined that an error does not occur in the printing apparatus 102, the process advances to S35.

In S35, the printing apparatus monitoring unit 206 waits for a given period and then proceeds to S31. The period of waiting may be a fixed period or may be dynamically changed depending on, for example, the size of a job to be executed. In S36, the printing apparatus monitoring unit 206 instructs the OS to make a toast notification.

Figure 4:
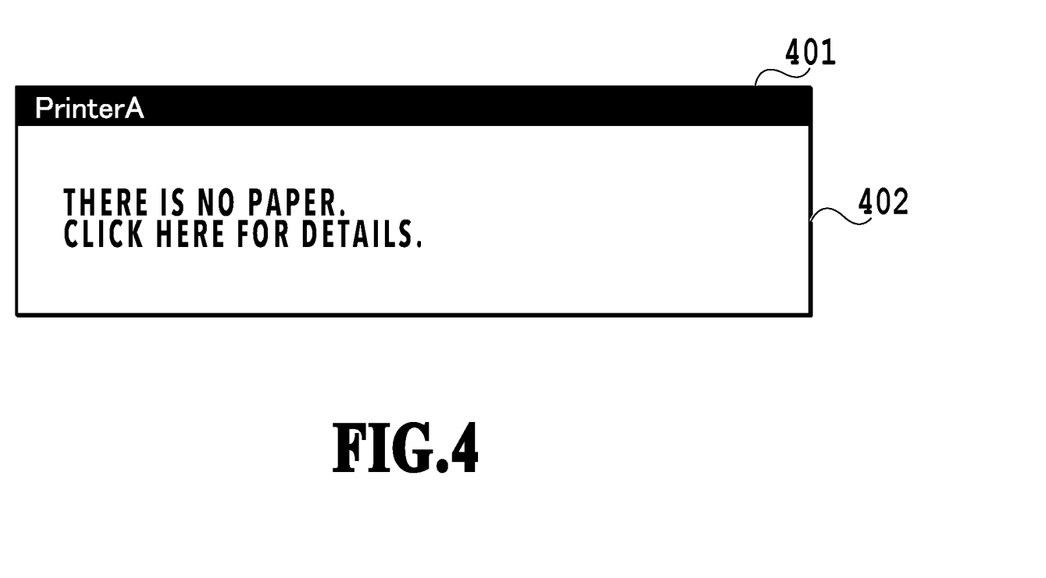
FIG. 4 is a display example of a toast displayed on the occurrence of an error in a printing apparatus.

FIG. 4 shows a notification example of a toast notified by the OS on the occurrence of an error in the printing apparatus 102. A UI of the toast comprises a title bar 401 and a message display section 402. The title bar 401 displays an application name, a printer name, or the like. The message display section 402 displays a message indicating a state of the printing apparatus 102. The message display section 402 may provide guidance using a BMP or animation. In a case where a user performs a predetermined operation such as a click operation on the message display section 402, the management information display unit 208 is activated and the user can know more detailed information about the printing apparatus 102.

At this time, the printing apparatus monitoring unit 206 obtains screen configuration information on the toast notification from the shared information 207. As the screen configuration information on the toast notification, the shared information 207 includes information such as text, bitmap, or animation to be notified.

Figure 5:
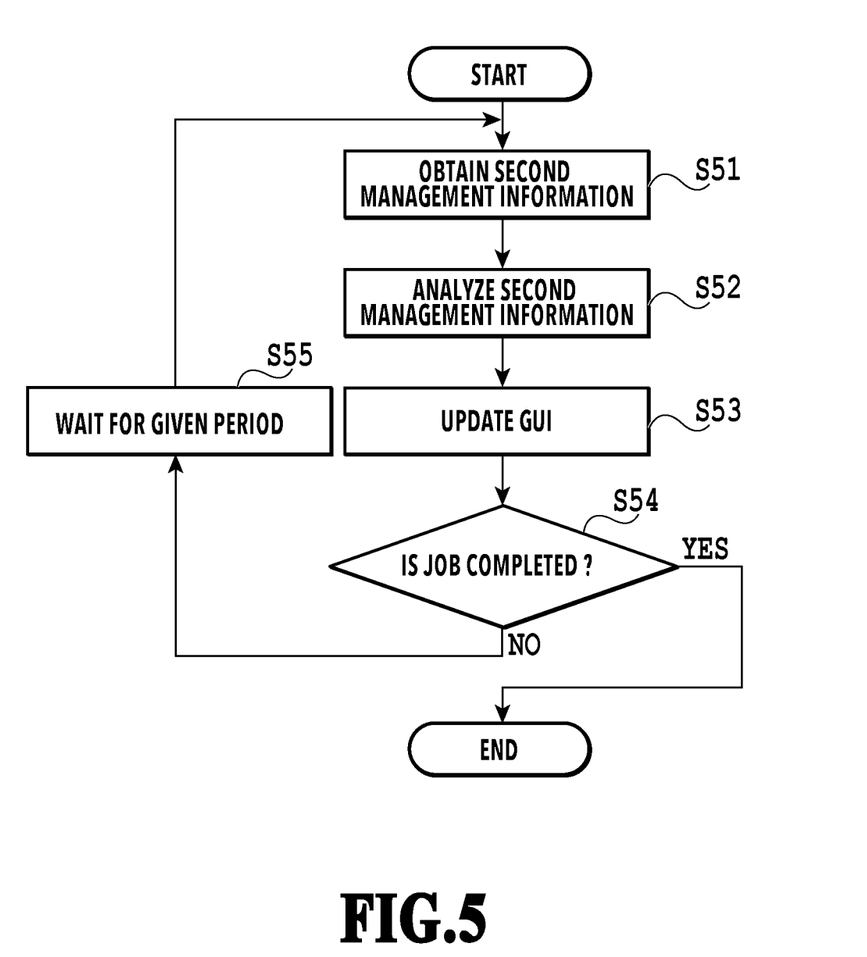
FIG. 5 is a diagram showing a processing flow of a management information display unit.

FIG. 5 shows the processing flow of the management information display unit 208 in the first embodiment. The flowchart shown in FIG. 5 is a process executed by the management information display unit 208 of the extension application 204. That is, the flowchart is implemented by the CPU 111 loading the program of the extension application 204 stored in the ROM 112 into the RAM 113 and executing the program. In the present embodiment, the OS activates the management information display unit 208 in response to an operation such as a click on the toast notified in S36 of FIG. 3. As described above, the management information display unit 208 is configured to display the GUI including detailed information about the printing apparatus 102 on the display unit 119 upon activation by the OS. That is, during the process of this flow, the management information display unit 208 continues display control of the GUI on the display unit 119 of the host computer 101.

In S51, the management information display unit 208 obtains second management information from the printing apparatus 102. The second management information is information obtained from the printing apparatus 102 by the management information display unit 208 using the vendor-specific information control unit 209. That is, the second management information at least includes vendor-specific information such as an error number or a URL of an ink purchase site, which is not included in the first management information obtained in S32. Part or all of the first management information may be included in the second management information. The vendor-specific information control unit 209 obtains the vendor-specific information according to a unique protocol. At this time, in order to reduce data traffic, the printing apparatus 102 may be inquired only about information not included in the first management information obtained in S31. In the case of inquiring the printing apparatus 102 about information other than the information obtained in S31, it is only necessary to write the first management information obtained in S31 to the shared information 207 and cause the management information display unit 208 to determine information not included in that information.

In the present embodiment, the vendor-specific information is obtained according to the unique protocol. However, the present disclosure is not limited to this. For example, the above vendor-specific information may be defined as an extended attribute of the IPP protocol, which is the OS standard protocol. In this case, the vendor-specific information control unit 209 may obtain the vendor-specific information using Get-Printer-Attributes Request, which is a printer attribute obtainment request according to the IPP protocol.

In S52, the management information display unit 208 analyzes the second management information obtained in S51. More specifically, the management information display unit 208 analyzes information such as a number of an error occurring in the printing apparatus 102, an ink remaining amount, a document name of a job being printed in the printing apparatus 102, an owner name, a printed page number, or a URL of an ink purchase site.

In S53, the management information display unit 208 updates the GUI based on the information analyzed in S52. That is, the management information display unit 208 updates the content of the GUI display whose display control is performed on the display unit of the host computer 101. Incidentally, although the flowchart shows that the content of the GUI display is updated in S53 because the process may be repeated in the flowchart, the processing of displaying the content in the GUI is performed in S53 immediately after the flowchart of FIG. 5 is started. The management information display unit 208 obtains a resource such as a message or bitmap (BMP) corresponding to the error number occurring in the printing apparatus 102 from the shared information 207 and performs display control of the resource in the GUI.

The content of the GUI display is the information analyzed in S52 (information such as a number of an error occurring in the printing apparatus 102, an ink remaining amount, a document name of a job being printed in the printing apparatus 102, an owner name, a printed page number, or a URL of an ink purchase site). That is, a user can be notified of more detailed information than the toast notification shown in FIG. 3. It is difficult for a user to grasp a method of removing an error in detail only by viewing the toast notification, whereas the user can grasp the content of the error in more detail by checking the display content of the GUI, which makes the removal operation easy. A display example of the GUI of the management information display unit 208 will be described later with reference to FIG. 6. Incidentally, in the present embodiment, a resource such as a message or BMP corresponding to an error number displayed in the GUI of the management information display unit 208 is obtained from the shared information 207. However, the present disclosure is not limited to this. For example, the management information display unit 208 may download screen configuration information stored in a specific server on the Internet and uses the downloaded information for GUI display.

In S54, the management information display unit 208 determines from the analysis result in S52 whether a job executed in the printing apparatus 102 has been completed. More specifically, the management information display unit 208 determines whether an error state has been removed by a user operation or the like and printing has been normally performed. If it is determined that the job has been completed in the printing apparatus 102, the process is finished.

The management information display unit 208 finishes the GUI display along with the end of the process. However, the GUI display does not necessarily have to be finished along with the end of the process. If it is determined that the job has not been completed in the printing apparatus 102, the process advances to S55.

In S55, the management information display unit 208 waits for a given period and then proceeds to S51. The period of waiting may be a fixed period or may be dynamically changed depending on, for example, the size of a job to be executed.

As described above, according to the flowchart of FIG. 5, for example, on the occurrence of an error, a user clicks the toast notification of FIG. 3, whereby the management information display unit 208 performs the GUI display including information such as details of the error. After a user checks the GUI display and removes the cause of the error, for example, the printing apparatus 102 resumes the suspended printing processing. As a result, since the management information display unit 208 can determine that the job has been completed in the printing apparatus 102 based on the second management information obtained in S51 and analyzed in S52, the process of the flowchart of FIG. 5 (i.e., GUI display/update process) is finished.

Figure 6:
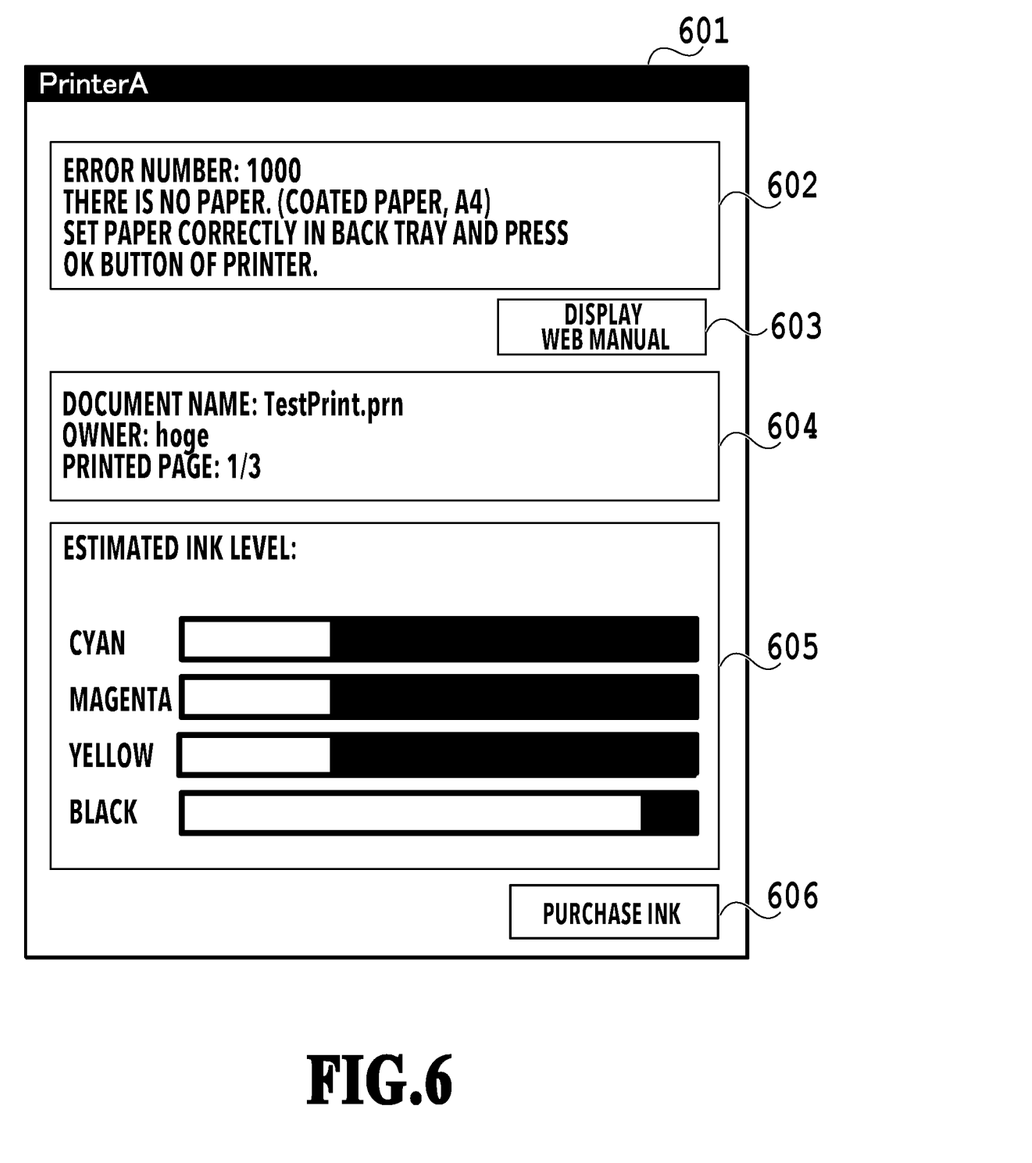
FIG. 6 is a diagram showing a display example of a GUI whose display control is performed by the management information display unit.

FIG. 6 shows a display example of the GUI displayed by the management information display unit 208 on the display unit 119 of the host computer 101. The GUI of the management information display unit 208 comprises a title bar 601, a message display section 602, a web manual display button 603, a job information display section 604, an ink information display section 605, and an ink purchase button 606. As described above, the display of the GUI is based on the contents of the second management information obtained in S51.

The title bar 601 displays an application name, a printer name, or the like. The message display section 602 displays a message indicating a state of the printing apparatus 102. For example, on the occurrence of an out-of-paper error in the printing apparatus 102, the message display section 602 displays, as a message, an error number, the explanation of a phenomenon, a removal method, and information about the type and size of paper to be set. Upon the press of the web manual display button 603, a default browser of the system is activated to display a page of a web manual prepared by the vendor corresponding to the error number. For example, the page of the web manual corresponding to the error number can show a video of the error removal method and enable a user to remove the error more intuitively. The present embodiment shows an example in which the GUI of FIG. 6 is displayed in a case where an error occurs in the printing apparatus 102 and a user clicks the toast notification of FIG. 3. However, the GUI display of FIG. 6 may also be displayed even in the absence of an error as will be described later. In a case where no error occurs in the printing apparatus 102, control may be performed so as not to display the web manual display button 603 on the screen or so as to gray out the button and inhibit the press thereof.

The job information display section 604 displays information about a job being executed in the printing apparatus 102. The ink information display section 605 displays ink information about the printing apparatus 102. Upon the press of the ink purchase button 606, a default browser of the system is activated to open an ink purchase page prepared by the vendor. URL information on the ink purchase page is different for each model and is included in the vendor-specific information obtained by the management information display unit 208.

As described above, according to the present embodiment, the use of the extension application of the OS standard driver enables notification of detailed information occurring in the printing apparatus. More specifically, since the use of the management information display unit 208 enables GUI display control of error information on the printing apparatus or the like, it becomes easy for a user to grasp the status of the printing apparatus. The extension application can also provide vendor-specific functions such as the function of providing a link to a web manual page corresponding to an error number occurring in the printing apparatus 102 or the function of providing a link to a corresponding ink purchase page.

In the present embodiment, toast screen configuration information is obtained from the shared information 207. However, the present disclosure is not limited to this. For example, the printing apparatus monitoring unit 206 may download screen configuration information stored in a specific server on the Internet and uses the downloaded information for the toast notification. In addition, the notification method is not limited to the toast. For example, a notification may be made using a timeline function supported by Windows 10 (registered trademark).

In the present embodiment, with a click on the toast notified in S36 of FIG. 3, the management information display unit 208 is activated and performs GUI display control. However, the activation method or the timing of GUI display is not limited to this. For example, the management information display unit 208 may remain active as a resident program without GUI display and the display control of the GUI may be performed upon detection of the start of printing in the printing apparatus 102 or upon error occurrence.

Second Embodiment

Errors which occur in the printing apparatus 102 includes errors removed by a direct operation in the printing apparatus 102 and errors removed by transmitting a control command to the printing apparatus 102. For example, an error concerning the opening of a cover of a printer is an error whose error state is removed by directly operating the cover of the printer. In contrast, a head position unadjusted error caused by absence of head position adjustment is an error whose error state is removed by transmitting a control command to adjust the head position from the host computer 101. As to an error whose error state is removed by transmitting a control command from the host computer 101, it is preferable to provide the function of issuing an error removal command together with an error notification by the management information display unit 208.

Accordingly, in the present embodiment, a description will be given of a system which removes an error state by transmitting a control command in a case where the management information display unit 208 detects an error occurring in the printing apparatus 102 and the error is removable by transmission of the control command.

Figure 7:
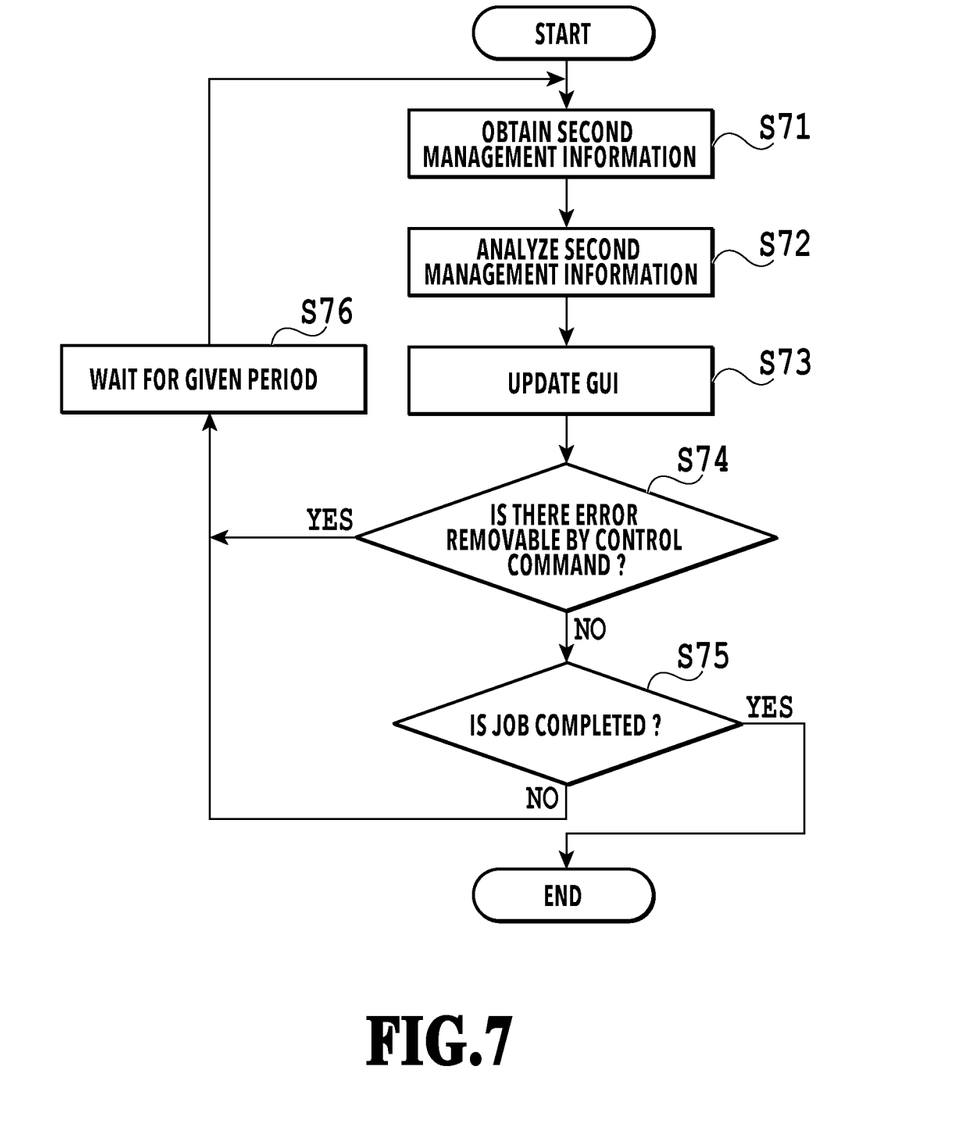
FIG. 7 is a diagram showing a processing flow of the management information display unit.

FIG. 7 shows a processing flow of the management information display unit 208 in the second embodiment. Since S71 and S72 are identical to S51 and S52 in FIG. 5, a description thereof is omitted.

In S73, the management information display unit 208 updates the GUI display based on the information analyzed in S72. The management information display unit 208 obtains, from the shared information 207, a resource such as a message or BMP corresponding to an error number occurring in the printing apparatus 102, and displays the resource in the GUI. A display example of the GUI of the management information display unit 208 in this case will be described later with reference to FIG. 8. If the error occurring in the printing apparatus 102 is removable by a control command supported by the management information display unit 208, an error removal button 807 to be described later is displayed. Whether the error is removable by a control command may be determined by the management information display unit 208 from the error number.

In S74, the management information display unit 208 determines whether an error removable by a control command supported by the management information display unit 208 occurs in the printing apparatus 102. In S74, the management information display unit does not determine that the error state has been removed only by the transmission of the control command from the host computer 101 to the printing apparatus 102. The management information display unit 208 determines in S74 that there is no error removable by the control command in a case where the printing apparatus 102 receives the control command from the host computer 101, executes the received control command, and confirms the removal of the error. If it is determined that there is an error removable by the control command supported by the management information display unit 208, the process advances to S76 and monitoring is continued. If it is determined that there is no error removable by the control command supported by the management information display unit 208, the process advances to S75.

In S75, the management information display unit 208 determines from the analysis result in S72 whether the job executed in the printing apparatus 102 has been completed. If it is determined that the job has been completed in the printing apparatus 102, the process is finished. If it is determined that the job has not been completed in the printing apparatus 102, the process advances to S76.

In S76, the management information display unit 208 waits for a given period and then proceeds to S71. The period of waiting may be a fixed period or may be dynamically changed depending on, for example, the size of a job to be executed.

Figure 8:
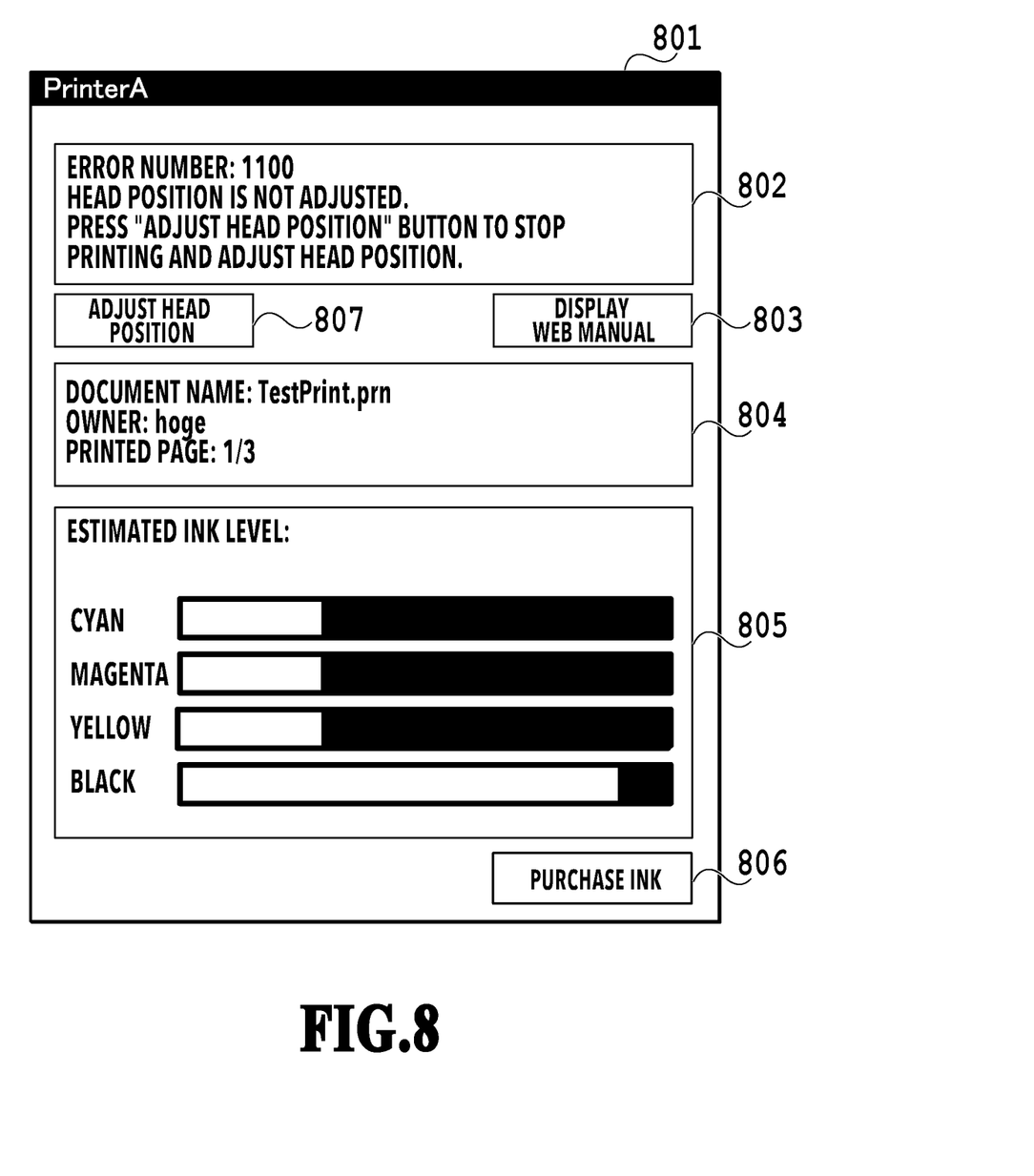
FIG. 8 is a diagram showing a display example of the GUI whose display control is performed by the management information display unit.

FIG. 8 shows a display example of the GUI whose display control is performed by the management information display unit 208 on the display unit 119 of the host computer 101 in the second embodiment. The GUI of the management information display unit 208 comprises a title bar 801, a message display section 802, a web manual display button 803, a job information display section 804, an ink information display section 805, an ink purchase button 806, and an error removal button 807. A description will be given of only portions different from the GUI display shown in FIG. 6.

The message display section 802 displays a message indicating a state of the printing apparatus 102. For example, on the occurrence of a head position unadjusted error in the printing apparatus 102, the message display section 802 displays, as a message, an error number, the explanation of a phenomenon, and the explanation of a removal method.

The error removal button 807 can remove an error state occurring in the printing apparatus 102 by being pressed. At this time, the management information display unit 208 generates an error removal command via the vendor-specific information control unit 209 and transmits the generated command to the printing apparatus 102. The error removal command may be transmitted using the HTTP communication protocol for example. Alternately, a control command may be generated as a job and the job may be transmitted to a printing port. Alternately, the management information display unit 208 may activate a default browser of the system, display a maintenance screen of a web browser embedded in the printing apparatus 102, and remove the error from the web browser. As shown in FIG. 8, the display name of the error removal button 807 may be changed according to the name of a control command to be transmitted. In a case where a control command is transmitted with the press of the error removal button 807, the management information display unit 208 continues monitoring processing until the error removal by the control command is completed.

In the present embodiment, an error removal command is transmitted to the printing apparatus 102 by a user pressing the error removal button 807. However, the present disclosure is not limited to this. For example, after the lapse of a given period from the detection of an error occurring in the printing apparatus 102, the management information display unit 208 may generate a command to remove the error state and transmits the generated command to the printing apparatus 102.

As described above, according to the present embodiment, a user can be provided with the function of transmitting a control command for error state removal together with notification of an error occurring in the printing apparatus 102 using the extension application of the OS standard driver.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-036259, filed Mar. 8, 2021, which is hereby incorporated by reference herein in its entirety.

What is claimed is:

1. An information processing apparatus comprising:
a controller including a memory containing instructions and a processor for executing the instructions to:
transmit, to a printing apparatus, print data generated by an IPP (Internet Print Protocol) driver which is included in an operating system and which is able to generate print data printable by printing apparatuses of vendors;
obtain first information from the printing apparatus according to an IPP (Internet Print Protocol);
make, by the operating system of the information processing apparatus, predetermined notification regarding a status of the printing apparatus based on the obtained first information;
obtain second information from the printing apparatus in a case where a predetermined operation is performed on the predetermined notification; and
by an application program which is not included in the operating system and which supports the IPP driver, cause, based on the obtained second information, a display to display detail information concerning the predetermined notification,
the detail information including at least vendor specific information not included in the predetermined notification.

2. The information processing apparatus according to claim 1, wherein the first information is regularly obtained from the printing apparatus using Get-Printer-Attributes Request, and
wherein, according to the predetermined operation, the second information is obtained from the printing apparatus using Get-Printer-Attributes Request.

3. The information processing apparatus according to claim 1, wherein the display is controlled to display information indicating a state of the printing apparatus as the detail information concerning the predetermined notification.

4. The information processing apparatus according to claim 1, wherein an OS is controlled to make toast notification as the predetermined notification.

5. The information processing apparatus according to claim 4, wherein the predetermined operation is a click operation on the toast notification.

6. The information processing apparatus according to claim 1, wherein the predetermined notification is error notification indicating an error which occurs in the printing apparatus.

7. The information processing apparatus according to claim 6, wherein the error is an error regarding a lack of sheet to be used for printing by the printing apparatus.

8. The information processing apparatus according to claim 1, wherein the processor executes the instructions to:
download the application program from a server using identification information of the printing apparatus acquired by the OS when the information processing apparatus is connected to the printing apparatus.

9. The information processing apparatus according to claim 1, wherein the vendor specific information is an error number of an error which occurs in the printing apparatus.

10. The information processing apparatus according to claim 1, wherein the vendor specific information is an object for causing a web browser of the information processing apparatus to display a web manual prepared by a vendor.

11. The information processing apparatus according to claim 1, wherein the vendor specific information is an object for causing a web browser of the information processing apparatus to display an ink purchase page prepared by a vendor.

12. The information processing apparatus according to claim 1, wherein the vendor specific information is an object for removing an error occurring in the printing apparatus, and
wherein the processor executes the instructions to transmit an error removing command for removing the error occurring in the printing apparatus.

13. A non-transitory computer-readable storage medium storing an application program which is not included in an operating system and supports an IPP (Internet Print Protocol) driver which is included in the operating system and which is able to generate print data printable by printing apparatuses of vendors, the application program being an application program for causing a computer of an information processing apparatus to:
obtain second information from a printing apparatus in a case where a predetermined operation is performed on predetermined notification regarding a status of the printing apparatus, the predetermined notification being performed by the operating system based on first information which is obtained from the printing apparatus according to an IPP (Internet Print Protocol); and
cause, based on the obtained second information, a display to display detail information concerning the predetermined notification,
the detail information concerning the predetermined notification including at least vendor specific information not included in the predetermined notification.

14. The storage medium according to claim 13, wherein the first information is regularly obtained from the printing apparatus using Get-Printer-Attributes Request, and
wherein, according to the predetermined operation, the second information is obtained from the printing apparatus using Get-Printer-Attributes Request.

15. The storage medium according to claim 13, wherein the display is controlled to display information indicating a state of the printing apparatus as the detail information concerning the predetermined notification.

16. The storage medium according to claim 13, wherein an OS is controlled to make toast notification as the predetermined notification.

17. The storage medium according to claim 16, wherein the predetermined operation is a click operation on the toast notification.

18. The storage medium according to claim 13, wherein the predetermined notification is error notification indicating an error which occurs in the printing apparatus.

19. The storage medium according to claim 18, wherein the error is an error regarding a lack of sheet to be used for printing by the printing apparatus.

20. The storage medium according to claim 13, wherein the application program is downloaded from a server using identification information of the printing apparatus acquired by the OS when the computer is connected to the printing apparatus.

21. The storage medium according to claim 13, wherein the application program is downloaded from a server using identification information of the printing apparatus acquired by the OS when the computer is connected to the printing apparatus.

22. The storage medium according to claim 13, wherein the vendor specific information is an object for causing a web browser of the information processing apparatus to display a web manual prepared by a vendor.

23. The storage medium according to claim 13, wherein the vendor specific information is an object for causing a web browser of the information processing apparatus to display an ink purchase page prepared by a vendor.

24. The storage medium according to claim 13, wherein the vendor specific information is an object for removing an error occurring in the printing apparatus, and
   wherein the application program further causes the computer of the information processing apparatus to transmit an error removing command for removing the error occurring the printing apparatus.

25. A method of controlling an information processing apparatus, the method comprising:
   obtaining second information from the printing apparatus in a case where a predetermined operation is performed on predetermined notification regarding a status of the printing apparatus, the predetermined notification being performed by an operating system based on first information which is obtained from the printing apparatus according to an IPP (Internet Print Protocol); and
   causing a display to display detail information concerning the predetermined notification,
   the detail information concerning the predetermined notification including at least vendor specific information not included in the predetermined notification.

* * * * *